United States Patent [19]

Palacios

[11] Patent Number: 5,026,958
[45] Date of Patent: Jun. 25, 1991

[54] COOKING CONTAINER OR LIKE ASSEMBLY FOR THE COOKING OF FOOD UTILIZING A MICROWAVE OVEN

[76] Inventor: Urania Palacios, 3709 Largo Dr., Miramar, Fla. 33023

[21] Appl. No.: 468,311

[22] Filed: Jan. 22, 1990

[51] Int. Cl.⁵ ............................................. H05B 6/80
[52] U.S. Cl. ...................... 219/10.55 E; 219/10.55 F; 426/113; 426/243; 99/DIG. 14; 220/669
[58] Field of Search ................ 209/10.55 E, 10.55 F; 426/107, 113, 111, 234, 241, 243; 99/DIG. 14; 220/72

[56] References Cited

U.S. PATENT DOCUMENTS

| 313,092 | 3/1885 | Mayes | 220/72 |
|---|---|---|---|
| 2,181,150 | 11/1939 | Pittenger | 220/72 |
| 3,835,281 | 9/1974 | Mannix | 219/10.55 E |
| 4,081,646 | 3/1978 | Goltsos | 219/10.55 E |
| 4,119,824 | 10/1978 | Jeambey | 426/243 |
| 4,616,762 | 10/1986 | Alexander | 220/72 |
| 4,801,773 | 1/1989 | Hanlon | 219/10.55 E |
| 4,834,247 | 5/1989 | Oshima et al. | 426/113 |
| 4,848,579 | 7/1989 | Barnes et al. | 426/107 |
| 4,868,360 | 9/1989 | Duncan | 219/10.55 F |
| 4,908,487 | 3/1990 | Sarnoff et al. | 219/10.55 E |

Primary Examiner—Philip H. Leung
Attorney, Agent, or Firm—Malloy, Downey & Malloy

[57] ABSTRACT

A container assembly for cooking relatively heavy and/or large amounts of food such as turkeys, roasts, large chickens, etc. in a microwave oven wherein the container, through the materials utilized and through certain structural features incorporated therein, has the integrity to support and contain the larger food products and further wherein a cover or lid structure is provided in most applications.

9 Claims, 2 Drawing Sheets

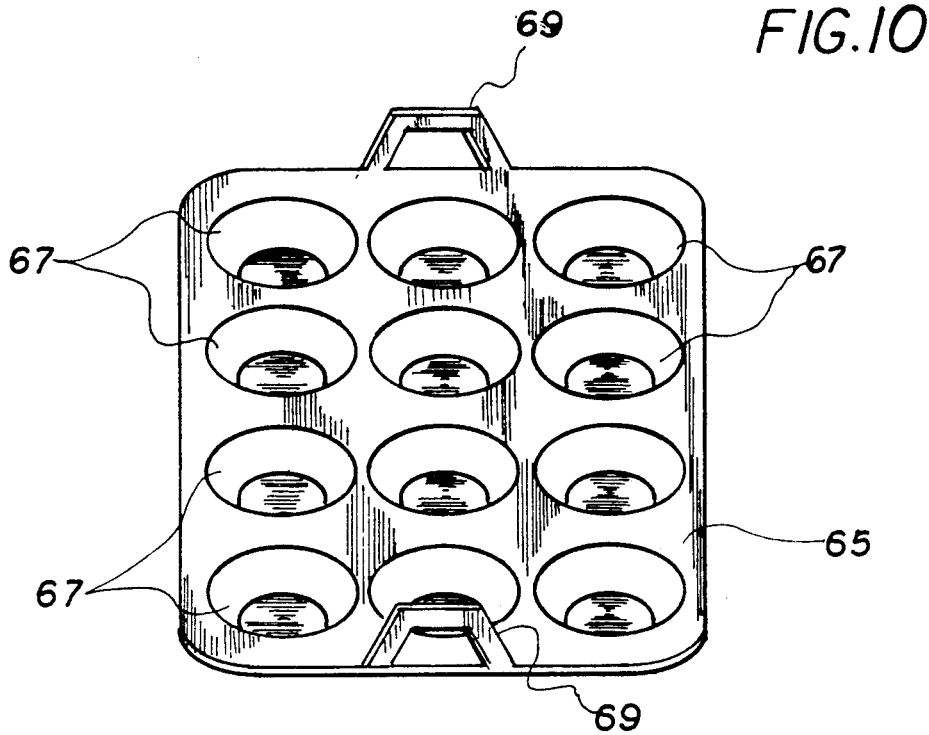
FIG. 10
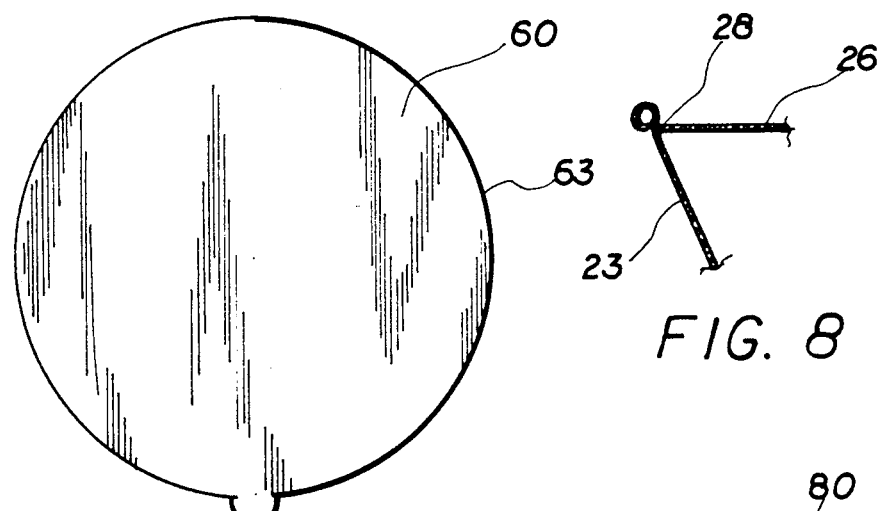
FIG. 7
FIG. 8
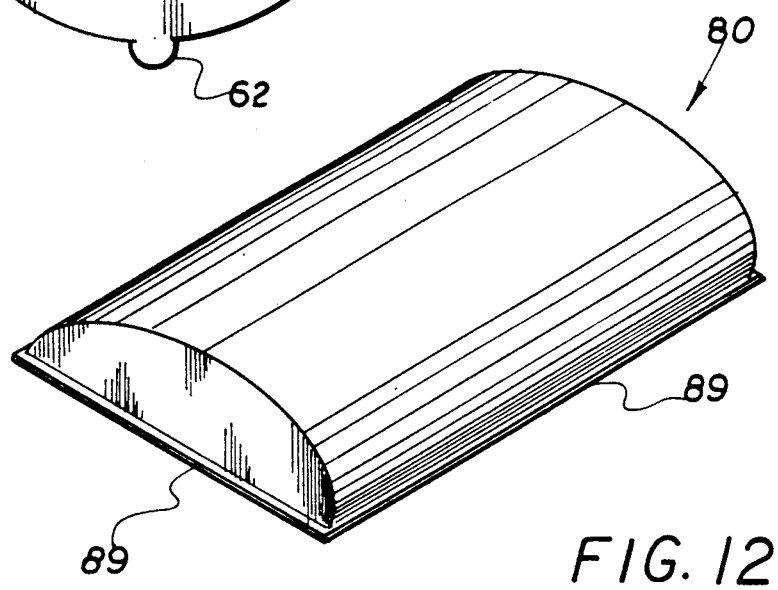
FIG. 12

COOKING CONTAINER OR LIKE ASSEMBLY FOR THE COOKING OF FOOD UTILIZING A MICROWAVE OVEN

BACKGROUND OF THE INVENTION

1. Field of the Invention

The present invention relates to a container specifically designed to provide for the cooking of products but is formed from a material which incorporates structural features allowing relatively larger quantities or food products to be supported therein during, before and after the cooking process.

2. Description of the Prior Art

Microwave cooking has enjoyed increased popularity throughout the last twenty years. With this increased popularity, a large number of containers having various design structures and configurations have been developed, primarily for specific applications, to contain food products in a manner which allows their cooking and/or heating in a conventional microwave oven. Naturally, to accomplish this, the material from which the container is formed must be permeable to microwaves and not include metallic material as a component part thereof. Typically, such containers are made from a paperboard type of material which is used to support relatively small amounts of food defining perhaps one or two servings of given food product. While larger plates or cooking vessels do exist which are capable of use in microwave ovens, such as glass, plastic, etc., such containers are not disposable and require storage and washing as do conventional cooking containers or vessels.

It is acknowledged that disposable aluminum foil type pans or containers do exist for "one time" containment and cooking of the larger food products but clearly, because of the material from which such pans are formed, they do not lend themselves to microwave cooking which is highly desirable in many instances.

Examples of prior art containers, packages, cooking vessels, etc. are evidenced in the following U.S. Pat. Nos. Kuchenbecker, 4,592,914, discloses a two blank disposable container for microwave food cooking which while certainly operable to cook or heat food products by the exposure to microwaves is of a lightweight design and would not be capable of holding larger food products such as turkeys, roasts, etc. Mikulski, U.S. Pat. No. 4,703,148, discloses a package for frozen foods and microwave heating of such frozen foods. This structure is capable of initially storing the food product for consumer purchase and freezing before and after such purchase, as well as allowing such food product to be exposed to microwaves in a conventional oven.

The patent to Daniels, U.S. Pat. No. 4,745,249, discloses a package and method of microwave heating of a food product which includes a plurality of components at least some of which are removable. Watkins, U.S. Pat. No. 4,425,368, discloses a food heating container of relatively large design but which is designed to package cold food products which allows heating of such products through the exposure to microwaves in a conventional microwave oven. Further, this structure discloses a food containing a food containing covered dish being disposed within a carton which is maintained in their relative positions both for refrigeration and heating of the food product.

McGonigle, U.S. Pat. No. 4,574,174, discloses a method and a structure for storing and cooking a convenience type "quick" meal in either a microwave oven or a conventional oven and includes various chambers for separation of the food products along with a removable lid structure. Moore, U.S. Pat. No. 4,585,915, similarly shows a microwave structure capable of both maintaining the food in a protected position during refrigeration or freezing as well as containing such food products during the heating or cooking by use of conventional microwave ovens.

While the above prior art structures are representative of numerous types of cooking vessels and storage containers, they generally are all of a lightweight construction capable of holding relatively small portions of food. The structures of the type disclosed above are not intended to hold conventionally larger amounts of food products such as a turkey typically cooked in the United States during holidays such as Thanksgiving or a large ham, roast, etc. There is, therefore, a need in this area for a disposable container which is capable of use for the adequate support and cooking of a large food product, of the type set forth above, in a microwave oven and further, wherein such container is disposable yet strong enough to support the cooked food for serving or the like.

SUMMARY OF THE INVENTION

The present invention relates to a cooking container or vessel constructed both in material and structural features to enable a relatively large food object to be stored, served, transported about the kitchen or cooking area, and cooked or reheated by microwaves using a conventionally sized microwave oven.

Further, the container assembly of the present invention while being specifically dimensioned to hold a large food object of the type set forth above may come in a variety of configurations such that various food types or food products can be cooked.

Accordingly, the container assembly of the present invention comprises a base generally including an integrally formed surrounding wall which may be in a multi-sided or generally circular, cylindrical configuration but rising up from the peripheral edges of the base. Both the base and the surrounding wall are formed of a material permeable to microwaves but yet, such material is sufficiently inexpensive so as to allow the entire container assembly to be disposable after use.

Further, in certain ones of the various embodiments of the present invention, a handle means is provided and is also integrally formed preferably on opposing sidewalls of the container assembly. Such handle means is also formed of the same material from which the base and surrounding walls are formed and is configured and dimensioned to extend upwardly and outwardly from the respective wall segments to which they are attached. The handle means also is specifically configured to allow and facilitate gripping by the hands of the user in order to carry the larger food objects between different locations generally in the kitchen or cooking area.

In certain ones of the embodiments, the container assembly further includes a cover or lid structure having a latch member attached thereto. The cover is formed along a common hinge line which may be integrally secured between correspondingly positioned longitudinal peripheral edges both of one of the wall segments of the surrounding wall as well as the cover structure. Further, in certain embodiments, the lid may be removably attached by forming a weakened hinge line to allow separation of the lid from the remainder of the container. A latch may be secured to an opposite side or edge of the cover and cooperate with a latch holder disposed in receiving relation to the latch member but formed on an opposite wall relative to the hinge or junction line. Such junction line or hinge, of course, allows the selective placement of the cover between an open, non-covering position and a closed, covering position.

Other structural features of the plurality of embodiments of the present invention allow for the cooking of of a variety of other products. Such products may include, but are not limited to, a large bird or fowl, roast, or the like, lasagna, biscuits or muffins, bread or meat loaves, etc.

In the embodiment defining the roasting pan, such container generally has a maximum longitudinal dimension of substantially sixteen inches and a maximum transverse dimension of substantially eleven inches and a maximum depth of substantially three inches. A structural embodiment which is designed to allow cooking or reheating of a meat or bread loaf therein, such corresponding dimensions include a length of substantially eight inches, a width of substantially three inches and a depth of substantially two and one-half inches. Similarly, a muffin or biscuit container includes dimensional configurations defined by a transverse dimension of each of the compartments in which a muffin or biscuit is held being substantially three inches and having a depth of substantially one and one-half inches.

Other pan configurations and preferred sizes include a square cake pan which can also double as a casserole pan having a dimension of eight inches in length, eight inches in width and approximately one and one-half to two inches in depth. Similarly, a round cake pan can have diameter of approximately eigth and one-half inches and a depth of one and one-half inches. A similarly shaped pie pan would have a diameter of eight inches and a depth of approximately one inch. A larger loaf pan in which bread or meat loaves can be cooked may have dimensions of eleven and three-quarter inches in length and three and one-quarter inches in depth. A large baking pan can include a length of thirteen inches, a width of nine inches and a depth of two or more inches and a lasagna pan may be rectangular in shape having a length of eleven and one-quarter inches, a width of nine and one-quarter inches and a depth of one and three-quarters to two inches.

Other structural features to be pointed out in greater detail hereinafter include vent means which allow escaping of gases from the interior of the container once a cover or lid structure, as mentioned above, is positioned in a closed, covering relation to the interior thereof. Such vent means may take a variety of configurations but may be otherwise closed until cooking begins and is then selectively opened to allow the escapement of gases as set forth above.

BRIEF DESCRIPTION OF THE DRAWINGS

For a fuller understanding of the nature of the present invention, reference should be had to the following detailed description taken in connection with the accompanying drawings in which:

FIG. 7 is one embodiment of a lid structure which may be used with a variety of the embodiments of FIGS. 1 through 6.

FIG. 8 is a sectional view showing a weakened line segment and hinge of a lid portion and a base portion.

FIG. 10 is another embodiment of the present invention represented as a biscuit or muffin pan.

FIG. 12 represents yet another embodiment of the present invention showing a lid for a roasting pan or loaf pan of the type shown preferably in FIGS. 5 and 11 respectively.

Like references numerals refer to like parts throughout the several views of the drawings.

DETAILED DESCRIPTION OF THE PREFERRED EMBODIMENT

Figures 1, 9:
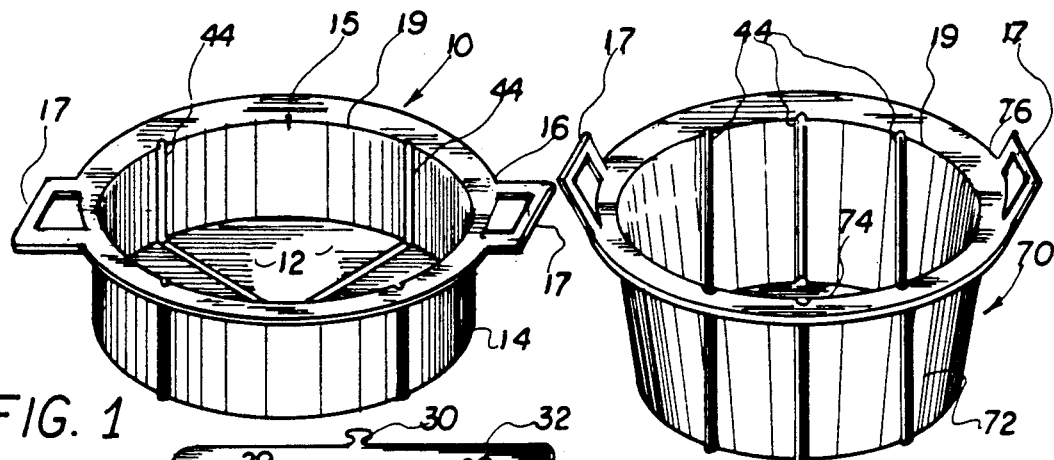
FIG. 1 represents one embodiment of the present invention.
FIG. 9 is another embodiment of a pan representing a deep dish baking pan or casserole pan.

As shown in FIGS. 1 through 12, the container assembly of the present invention may comprise a variety of structural configurations depending upon the particular food item or object which it is intended to contain and cook. In the embodiment of FIG. 1, generally indicated as 10, a base 12 has a substantially flat inner surface and the container further includes a surrounding generally cylindrical wall 14 for containment of the contents within the interior as at 15 in supporting relation on the base 12. A peripheral flange or lip as at 16 surrounds the outer peripheral open end of the container 10 and includes two oppositely disposed spaced apart handles as at 17 attached thereto for the carrying and/or lifting of the container as desired. In addition, an inner peripheral groove as at 19 is provided along the inner surface of the container 10, such peripheral groove is located immediately adjacent the open end but inwardly of the flange 16 and is provided to accommodate the peripheral edge of an accommodating lid member 60 as shown in FIG. 7. The lid 60 includes an integrally formed tab as at 62 secured thereto. Such tab, of course, is provided so as to facilitate removal of the lid 60 from its overlying, covering relation to the interior 15 of the container 10 as its peripheral edges as at 63 are removed from the peripheral groove 19.

Figure 2:
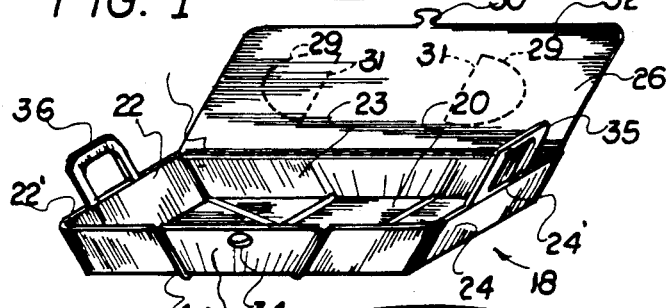
FIG. 2 represents another embodiment of the present invention incorporating a cover or lid structure.

The embodiment of FIG. 2 is generally indicated as 18 and has a bas e 20 surrounded by outwardly flared, substantially angularly oriented sidewall segments 21, 22, 23 and 24. The sidewall segments 21 through 24 are integrally secured to the peripheral edge of the base and define the surrounding boundaries of the inner chamber or interior of the assembly 18 in which the food product is maintained. A cover or lid structure 26 is integrally fastened to the remainder of the structure along a common junction line 28 which may define a hinge structure. The hinge or common junction 28 is formed at the upper peripheral edge of the sidewall segment 23 and one longitudinal peripheral edge of the cover 26. The cover, therefore, is allowed to selectively be positioned between a closed, covering relation to the interior of the assembly or an open, non-covering relation to the interior of the assembly. Another feature associated with the junction line 28 is that it may be weakened to facilitate tearing therealong such that the lid 26 may be readily removed from the remainder of the container and particularly the side wall 23 when, of course, it is desired to use the pan 18 without such a lid. Another feature includes vent means in the form of vent closures 29 being surronded about their periphery by a weakened junction or connecting line 31 which may be easily torn or separated from the remainder of the lid 26 similar to the structure of the junction or hinge line 26. The vent covers 29 may therefore be removed entirely or in part when the lid 26 is in its closed and locked position in order to allow escaping of gases or vapors during heating of the food therein.

A latch element as 30 may be integrally formed and extend outwardly from an opposite longitudinal edge as at 32. A latch receiving member 34 is integrally formed in the sidewall segment 21 and is disposed to receive the latch member 30 therein for removable locking closure of the cover 26.

A handle means comprises two spaced apart handle members 35 and 36 which extend upwardly and outwardly from outer peripheral edges as at 22' and 24' of the sidewall segments 22 and 24 respectively. These handle members 35 and 36 are, of course, provided to facilitate gripping and carrying of the container assembly 18 whether or not a food product is contained on the interior thereof.

Figure 3:
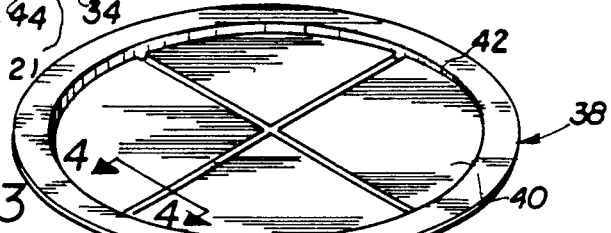
FIG. 3 represents yet another embodiment of the present invention primarily designed to cook a pizza or flat pie type structure.

Another embodiment of the present invention is generally indicated as 38 in FIG. 3 and includes a flat pie shaped pan primarily for the cooking of pizza or other relatively flat food objects. The base as at 40 is generally round in configuration and the sidewalls have a minimal height defined more specifically by a surrounding raised lip 42 having a somewhat circular configuration corresponding to the periphery of the base 40 and integrally attached thereto.

Figures 4, 5, 11:
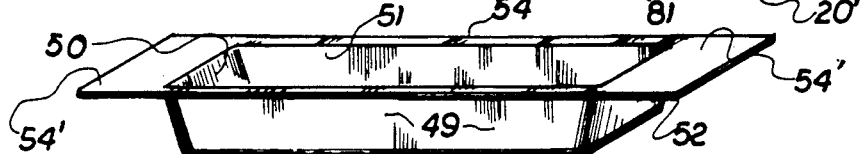
FIG. 4 is a sectional view in partial cut-away of the material from which the embodiment of FIG. 3 is formed.
FIG. 5 is an elongated substantially rectangular pan structure defining yet another embodiment of the present invention.
FIG. 11 represents yet another embodiment of the present invention in the form of a large roasting pan.

FIG. 4 is a sectional view along line 4—4 of FIG. 3 and represents a corrugation or crease integrally formed in the base. This crease as shown in FIG. 4 is indicated as 44 and is representative of all the corrugations or creases formed throughout each of the embodiments. Such corrugation creasing or the like serves to add to the overall strength or structural integrity of the various embodiments to be described above and more fully hereinafter thereby enabling a larger, heavier food product such as a turkey 45 or any other large relatively heavy food product to be carried and cooked within the container specifically adapted for such use. The corrugations are included in the embodiments of the present invention for purposes of overall strengthening and providing additional structural integrity therefore especially adapting the pans for use with substantially heavy food products or large amounts of such food products. However, the corrugations may in fact be eliminated by increasing the thickness of the material from which the pans or containers are formed. Such material may include food grade paperboard of the type quality used in microwave ovens and which are heat resistant and non-combustible up to a temperature of at least 375° F. for a period of thirty minutes. Such material is also capable of use for freezing the material. Absent the corrugations, an additional layer or layers of such material will be utilized in order to provide the required structural intergrity as set forth above.

FIG. 5 shows an elongated rectangular pan having a base 48 extending along the length in transverse dimension thereof. Wall segments 49, 50, 51 and 52 are integrally formed about the peripheral edge of base 48 and extend upwardly and somewhat outwardly therefrom.

A surrounding, outwardly dxtending peripheral flange as at 54 is integrally secured and continuously formed along the upper peripheral edge of the wall segments collectively and, as with the embodiment of FIG. 1, may serve either as a handle means or as a support for any type of conventional lid structure. The ends of the flange 54 as at 54' may be enlarged to facilitate gripping of the pan and handling thereof. The embodiment of FIG. 5 may be more typically described as a loaf pan in which either meat or a bread type loaf product may be formed.

Figure 6:
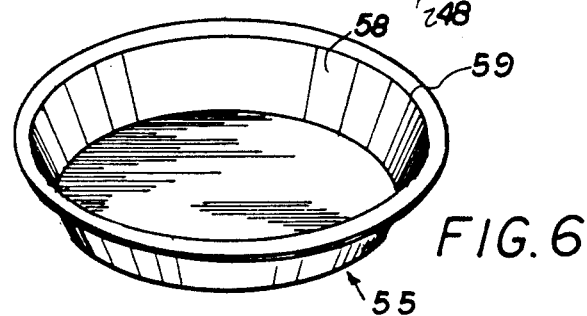
FIG. 6 is a sectional view in partial cut-away showing layered and laminated material from which at least one of the embodiments is formed.

FIG. 6 represents a structure typically in which a fruit or meat pie type food product may be formed and/or cooked Such product is generally indicated as 55 and includes a base 56 having a substantially circular outer peripheral edge integrally connected to a continuous upwardly and outwardly extending containing sidewall 58. In addition, the side wall has an outwardly extending peripheral flange as at 59 to aid in the gripping or handling of the pie pan as should be apparent.

FIG. 10 represents a muffin or biscuit pan having a flat base with a planar configuration indicated as 65. Integrally formed into the base and depending downwardly therefrom is a plurality of pockets 67. The pockets have a transverse dimension and depth so as to allow muffins, biscuits or like objects to be retained and cooked therein. Oppositely disposed handles as at 69 are integrally formed on and extend outwardly from the base 60 so as to facilitate gripping or handling of the container of the embodiment of FIG. 10.

The embodiment of FIG. 9 is somewhat similar to the embodiment of FIG. 1 and is represented generally as 70. In this embodiment, a cylindrical sidewall 72 is integrally formed about the peripheral edge of the base 74. A surrounding ledge as at 76 is present and handle 17 are attached thereto. A peripheral groove 19 is present to receive the lid 70 of FIG. 7.

The difference between the embodiment of FIG. 1 and the embodiment of FIG. 9 is the overall depth and transverse dimension of the two structures thereby directly affecting the capacity and/or size, volume, weight, etc. of the product to be carried and cooked therein.

The embodiment of FIG. 11 may be represented typically as a roasting pan similar to that of the embodiment of FIG. 2 but absent a lid structure. Accordingly, the base is represented as 20 and having a plurality of sidewalls 81, 82, 83 and 84. Opposite endwall segments 82 and 84 include handle elements 35 and 36' which may define a handle means as set forth above with greater specificity.

FIG. 12 represents a domed type of cover or lid and is generally indicated as 80. Lid 80 includes a peripheral flange 89 surrounding the entire open end of the domed lid 80. Such flange 89 is designed to fit over the upper peripheral edge of the opening of the roasting pan of the type shown in FIG. 11. The lid structure 80 is also dimensioned and configured to fit within the handles 36' such that the roasting pan as shown in FIG. 11, when covered, can still be carried and transported as desired.

FIG. 8 represents the aforementioned junction line 28 which also serves as a hinge between the lid 26 and the side wall 23 such as in the embodiment of FIG. 2 wherein the container is represented as 18. The junction line as at 28 may be weakened to facilitate separation of the lid from the remainder of the container as set forth above.

Now that the invention has been described, what is claimed is:

1. A container assembly for cooking food in a microwave oven, said assembly comprising:
   a. a base including a floor and surrounding sidewalls secured thereto and formed from a material permeable to microwaves,
   b. said floor and said sidewalls cooperatively dimensioned and configured to define a chamber means for the containment of food therein, said chamber including an open mouth,
   c. a lid structure mounted on said base along a peripheral edge of said sidewalls and selectively positionable between an open, uncovered and a closed, covered position relative to said chamber means and food contained therein,
   d. handle means integrally secured to oppositely disposed ones of said sidewalls and extending outwardly therefrom and dimensioned and configured to facilitate gripping by the hands of the user,
   e. a crimping structure integrally formed in said base and disposed to strengthen said base and allow containment and carrying of substantial quantities of food therein,
   f. said base and said lid structure being formed from a paperboard material coated over the entire outer exposed surface thereof with a plastic, heat resistant coat permeable to microwaves,
   g. an integrally formed hinge pivotally attaching said lid structure to said base, and
   h. a latch structure integrally formed in both said lid structure and said base adjacent opposite peripheral edges relative to said hinge structure.

2. An assembly as in claim 1 wherein said pan is structured and configured to define a pan capable of conducting baking and roasting in a microwave oven.

3. An assembly as in claim 2 wherein said base comprises a longitudinal dimension of substantially sixteen inches to eight inches and a transverses dimension of about substantially eleven inches to three inches and a depth of about substantially three inches to one-half inch.

4. An assembly as in claim 3 wherein said base is dimensioned and configured to define a roasting pan dimensioned to have a maximum longitudinal dimension of substantially sixteen inches, and a maximum transverse dimension of substantially eleven and one-half inches and a maximum, depth of substantially three inches.

5. An assembly as in claim 3 wherein said base is dimensioned and configured to define a lasagna cooking pan having a length of substantially eleven and one-quarter inches, a width of substantially nine and one-half inches and depth of substantially one and three-quarter inches.

6. An assembly as in claim 3 wherein said base is dimensioned and configured to define a loaf pan having a length of substantially eight inches, a width of substantially three and three-quarter inches and a depth of substantially two and one-half inches.

7. An assembly as in claim 3 wherein said base is dimensioned and configured to define a round casserole pan being substantially eight inches in diameter and substantially two and one-quarter inches deep.

8. An assembly as in claim 1 wherein said chamber is divided into a plurality of compartments of common size and configuration and each being dimensioned to include a transverse dimension of substantially three inches and a depth of substantially one and one-half inches and structured to cook a plurality of muffins or biscuits therein.

9. An assembly as in claim 1 further comprising vent means formed in said lid structure and disposed to vent gases therethrough from an interior of said chamber.

* * * * *